(12) United States Patent
Noutary

(10) Patent No.: US 7,686,443 B2
(45) Date of Patent: Mar. 30, 2010

(54) PRINTING INK FOR INK-JET PRINTING

(75) Inventor: Carole Noutary, Broadstairs (GB)

(73) Assignee: Sericol Limited, Broadstairs, Kent (GB)

( * ) Notice: Subject to any disclaimer, the term of this patent is extended or adjusted under 35 U.S.C. 154(b) by 1046 days.

(21) Appl. No.: 10/520,987

(22) PCT Filed: Jul. 8, 2003

(86) PCT No.: PCT/GB03/02954

§ 371 (c)(1),
(2), (4) Date: Aug. 10, 2005

(87) PCT Pub. No.: WO2004/005412

PCT Pub. Date: Jan. 15, 2004

(65) Prior Publication Data

US 2006/0098064 A1   May 11, 2006

(30) Foreign Application Priority Data

Jul. 9, 2002    (GB) ................... 0215854.1

(51) Int. Cl.
*G01D 11/00* (2006.01)
(52) U.S. Cl. .............. 347/100; 347/95; 522/39
(58) Field of Classification Search ........ 347/100, 347/95, 96, 101; 523/160, 161; 106/31.6, 106/31.13, 31.27; 522/39, 42, 37
See application file for complete search history.

(56) References Cited

U.S. PATENT DOCUMENTS

| 5,275,646 | A | * | 1/1994 | Marshall et al. ............. 347/100 |
| 5,641,346 | A | * | 6/1997 | Mantell et al. ............. 347/100 |
| 5,889,084 | A | * | 3/1999 | Roth ......................... 523/161 |
| 6,558,753 | B1 | * | 5/2003 | Ylitalo et al. ............... 427/466 |

FOREIGN PATENT DOCUMENTS

| EP | 779346 A2 | * | 6/1997 |
| GB | 2256874 | * | 12/1992 |
| WO | WO 00/31189 | * | 6/2000 |

* cited by examiner

*Primary Examiner*—Manish S Shah
(74) *Attorney, Agent, or Firm*—Buckley, Maschoff & Talwalkar LLC

(57) ABSTRACT

This invention relates to inks for use in ink-jet printers that are cured using ultraviolet radiation. Specifically, the present invention relates to an ink-jet ink which is substantially free of water, volatile organic solvents and multifunctional (meth) acrylates comprising at least one monofunctional (meth)acrylate monomer, at least one α,β-unsaturated ether monomer, at least one radical photoinitiator and at least one coloring agent, the ink having a viscosity of less than 50 mPas at 25° C. This provides extra-low viscosity inks, which still meet the requirements for printing onto porous substrates such as paper and board.

14 Claims, No Drawings

PRINTING INK FOR INK-JET PRINTING

This invention concerns inks for use in ink-jet printers. In particular, this invention concerns inks for use in ink-jet printers that are cured using ultraviolet radiation.

In ink-jet printing, minute droplets of black or coloured ink are ejected in a controlled manner from one or more reservoirs or printing heads through narrow nozzles on to a substrate, which is moving relative to the reservoirs. The ejected ink forms an image on the substrate. For high-speed printing, the inks must flow rapidly from the printing heads, and, to ensure that this happens, they must have in use a low viscosity, typically below 50 mPas at 25° C. although in most applications the viscosity should be below 25 mPas. Typically, when ejected through the nozzles, the ink has a viscosity of 10.5 mPas at the jetting temperature, which is usually elevated to about 40° C. (the ink might have a much higher viscosity at ambient temperature). Some print heads require especially low viscosity, such as 4 or 5 mPas at the jetting temperature, to achieve reliable jetting performance. Furthermore, different materials are used in the manufacture of print heads, some of which may be sensitive to higher temperatures, thereby limiting the jetting temperature to close to ambient temperature. This puts additional pressure on the viscosity requirements of the product. For reasons such as ease of engineering and cost concerns, printer integrators would also rather avoid having to heat the print head to achieve reliable jetting. Thus, low viscosity ink-jet inks are highly desirable.

The inks must also be resistant to drying or crusting in the reservoirs or nozzles. For these reasons, ink-jet inks for application at or near ambient temperatures are commonly formulated to contain a large proportion of a mobile liquid vehicle or solvent. In one common type of ink-jet ink this liquid is water—see for example the paper by Henry R. Kang in the Journal of Imaging Science, 35(3), pp. 179-188 (1991). In those systems, great effort must be made to ensure the inks do not dry in the head due to water evaporation. In another common type the liquid is a low-boiling solvent or mixture of solvents—see, for example, EP 0 314 403, EP 0 424 714 and GB9927247.8. Unfortunately, ink-jet inks that include a large proportion of water or solvent cannot be handled after printing until the inks have dried, either by evaporation of the solvent or its absorption into the substrate. This drying process is often slow and in many cases (for example, when printing on to a heat-sensitive substrate such as paper) cannot be accelerated.

Another type of ink-jet ink contains unsaturated organic compounds, termed monomers, which polymerise by irradiation, commonly with ultraviolet light, in the presence of a photoinitiator. This type of ink has the advantage that it is not necessary to evaporate the liquid phase to dry the print; instead the print is exposed to radiation to cure or harden it, a process that is more rapid than evaporation of solvent at moderate temperatures. These monomers maybe acrylate or methacrylate esters, as is disclosed in EP 0540203B, U.S. Pat. No. 5,270,368 and in WO 97 31071. In such ink-jet inks it is necessary to use monomers possessing a low viscosity. In practice it is difficult to find (meth)acrylate monomers or combinations of (meth)acrylate monomers which do not give compositions with an unacceptably high viscosity for ink-jet printing. This is especially true if materials are selected with more than one polymerisable functional group in, the molecule, though these monomers have the advantage of giving a more cross-linked, and therefore tougher, polymer after irradiation. Thus, there is a restriction on the selection of the higher molecular weight multifunctional (meth)acrylates which are generally more viscous but which, other things being equal, give after polymerisation more resistant films. In practice monofunctional acrylate monomers need to be used with multifunctional acrylate monomers to arrive at a suitably low viscosity for ink-jet printing. However, this tends to reduce the cure speed and decreases the cross-link density, which affects properties such as adhesion and toughness, when printed onto non-porous substrates.

Another method for producing UV ink-jet inks with low viscosity and good end-user properties is described in PCT/GB02/00368. This method, which describes the use of $\alpha,\beta$-unsaturated ether monomers, especially vinyl ethers, with multifunctional (meth)acrylates, eliminates the requirement for monofunctional acrylates in the ink due to the very good diluency properties of $\alpha,\beta$-unsaturated ether monomers. Low viscosity products with very good chemical resistance, fast curing speed and good adhesion to a wide range of materials are thus achieved.

Nevertheless, in the case of some applications, such as paper and board printing for example for the packaging industry, the adhesion requirements are less demanding than when printing onto non-porous substrates. There are fewer requirements for properties such as cure speed and adhesion due to absorption of part of the ink into the porous material. It is therefore possible to produce inks containing monofunctional (meth)acrylates with a very low viscosity but which still meet the application requirements for porous substrates.

Accordingly, the present invention provides an ink-jet ink which is substantially free of water, volatile organic solvents and multifunctional, (meth)acrylates, comprising at least one monofunctional (meth)acrylate monomer, at least one $\alpha,\beta$-unsaturated ether monomer, at least one radical photoinitiator and at least one colouring agent, the ink having a viscosity of less than 50 mPas at 25° C.

The present invention thus provides extra-low viscosity inks, which still meet the requirements for printing onto porous substrates: such as paper and board. This is achieved by using a mixture of $\alpha,\beta$-unsaturated ether monomer—which allows a sufficiently high degree of cross-linking to achieve a sufficient cure speed—and monofunctional (meth)acrylates, which gives a very low viscosity product.

Preferably the ink is suitable for printing onto porous substrates.

Preferably the ink includes, by weight, from 2 to 15 (particularly preferably 5 to 15) parts of monofunctional (meth)acrylate monomer to 1 part of $\alpha,\beta$-unsaturated ether monomer.

Preferably, the monofunctional (meth)acrylate monomers are preferably the esters of acrylic acid, for example octyl acrylate, decyl acrylate, isobornyl acrylate, phenoxyethyl acrylate, tetrahydrofuryl acrylate, 2-(2-ethoxyethoxy) ethylacrylate, and mixtures thereof Esters of methacrylic acid (i.e. methacrylates) can be, for example, allyl methacrylate, tetrahydrofury methacrylate, 2-phenoxyethyl methacrylate and isobornyl methacrylate.

Preferably the monofunctional (meth)acrylate monomer is present in an amount from 50 to 95% by weight, preferably from 60 to 80% by weight.

The phrase "substantially free of multifunction (meth) acrylates used herein means that multifunctional (meth)acrylates are to be avoided in order to maintain a low viscosity, although, small amounts of multifunctional (meth)acrylates are tolerated. The amounts of multifunctional (meth)acrylates are kept to a minimum such that the majority of cross-links are formed by the $\alpha,\beta$-unsaturated ether monomers rather than the multifunctional (meth)acrylate monomers.

Preferably, multifunctional (meth)acrylate monomers are present at less than 10%, particularly preferably less than 5%.

One or more α,β-unsaturated ether monomers must be present in the composition of the present invention. Examples of α,β-unsaturated ether monomers are vinyl ether monomers, such as triethylene glycol divinyl ether, diethylene glycol divinyl ether, 1,4-cyclohexanedimethanol divinyl ether and ethylene glycol monovinyl ether, as well as ethyl-1 propenyl ether, triethyleneglycol methyl propenyl ether, triethyleneglycol methyl vinyl ether and 2-cyclopenten-1-yl ether. Mixtures of α,β-unsaturated ether monomers may be used. The proportion of multifunctional α,β-unsaturated ether monomer is preferably between 1 and 30% by weight, more preferably between 7 and 15%, provided that the ratio of acrylate monomer to α,β-unsaturated ether monomer lies between 5:1 and 15:1. Preferably multifunctional, more preferably difunctional and trifunctional α,β-unsaturated ether monomers are used.

Preferably the α,β-unsaturated ether monomer is present from 1 to 30% by weight, particularly preferably from 7 to 15%, provided that the ratio of (meth)acrylate monomer to α,β-unsaturated ether monomer is between 2:1 and 15:1.

Preferably the α,β-unsaturated ether monomer is a vinyl ether monomer. Particularly preferably the vinyl ether is selected from triethylene glycol divinyl ether, diethylene glycol divinyl ether, 1,4-cyclohexanedimethanol divinyl ether, ethylene glycol monovinyl ether and mixtures thereof.

In addition to the monomers described above, the compositions include a photoinitiator, which, under irradiation by ultraviolet light, initiates the polymerization of the monomers. Preferred are photoinitiators which produce free radicals on irradiation (free radical photoinitiators) such as, for example, benzophenone, 1-hydroxycyclohexyl phenyl ketone, 2-benzyl-2-dimethylamino-(4-morpholinophenyl) butan-1-one, benzil dimethylketal, bis(2,6-dimethylbenzoyl)-2,4,4-trimethylpentylphosphine oxide or mixtures thereof Such photoinitiators are known and commercially available such as, for example, under the trade names Irgacure, Darocur (from Ciba) and Lucerin (from BASF).

Preferably the photoinitiator is present from 1 to 20% by weight, preferably from 4 to 10% by weight, of the ink.

The ink-jet ink of the present invention also includes a colouring agent, which may be either dissolved or dispersed in the liquid medium of the ink. Preferably the colouring agent is a dispersible pigment, of the types known in the art and commercially available such as, for example, under the trade-names Paliotol (available from BASF plc), Cinquasia, Irgalite (both available from Ciba Speciality Chemicals) and Hostaperm (available from Clariant UK). The pigment may be of any desired colour such as, for example, Pigment Yellow 13, Pigment Yellow 83, Pigment Red 9, Pigment Red 184, Pigment Blue 15:3, Pigment Green 7, Pigment Violet 19, Pigment Black 7. Especially useful are black and the colours required for trichromatic process printing. Mixtures of pigments may be used. The total proportion of pigment present is preferably from 0.5 to 15% by weight, more preferably from 1 to 5% by weight. Other components of types known in the art may be present in the ink to improve the properties or performance. These components may be, for example, surfactants, defoamers, dispersants, synergists for the photoinitiator, stabilisers against deterioration by heat or light, reodorants, flow or slip aids, biocides and identifying tracers.

The present invention also provides a method of ink-jet printing using the above-described ink.

Preferably the printing is carried out on porous substrates.

The ink of the present invention is preferably cured by ultraviolet irradiation and is suitable for application by ink-jet printing.

We have found that this ink-jet ink exhibits a desirable very low viscosity (less than 50 mPas, more preferably less than 20 mPas and most preferably less than 10 mPas at 25° C.).

(Meth)acrylate is intended herein to have its standard meaning, i.e. acrylate and/or methacrylate.

The inks of the invention may be prepared by known methods such as, for example, stirring with a high-speed water-cooled stirrer, or milling on a horizontal bead-mill.

EXAMPLES

The invention will now be described, by way of example, with reference to the following examples (parts given are by weight). Examples 1 to 3 are cyan UV ink-jet inks. These inks use combinations of monofunctional acrylate monomers and of α,β-unsaturated ethers.

Example 1

| | |
|---|---|
| Sartomer 339 (UV diluent from Cray Valley) | 69.4 parts |
| Solsperse 32000 (dispersant from Avecia) | 0.40 parts |
| Irgalite Blue (pigment from Ciba) | 3.60 parts |
| Genorad 16 (stabiliser from Rahn AG) | 0.05 parts |
| Rapi-cure DVE-3 (difunctional vinyl ether from ISP Europe) | 10.0 parts |
| Lucirin TPO (photoinitiator from BASF) | 8.5 parts |
| Benzophenone (photoinitiator) | 4.0 parts |
| Irgacure 184 (photoinitiator from Ciba) | 4.0 parts |
| Byk 307 (defoamer from BYK Chemie) | 0.05 parts |

Sartomer 339 is phenoxy ethyl acrylate, i.e. a monofunctional acrylate. The product was an ink having a viscosity of 12.7 mPas at 25° C. The ink was printed on to paper and irradiated by passing 30 m/min under light from an iron-doped ultra-violet lamp of power 120 W/cm. The ink gave a print with good cure, adhesion and chemical resistance.

Example 2

| | |
|---|---|
| Sartomer 256 (UV diluent from Cray Valley) | 69.4 parts |
| Solsperse 32000 (dispersant from Avecia) | 0.40 parts |
| Irgalite Blue (pigment from Ciba) | 3.60 parts |
| Genorad 16 | 0.05 parts |
| Rapi-cure DVE-3 (difunctional vinyl ether from ISP Europe) | 10.0 parts |
| Lucirin TPO (photoinitiator from BASF) | 8.5 parts |
| Benzophenone (photoinitiator) | 4.0 parts |
| Irgacure 184 (photoinitiator from Ciba) | 4.0 parts |
| Byk 307 (defoamer from BYK Chemie) | 0.05 parts |

Sartomer 256 is 2-(2-ethoxyethoxy)ethyl acrylate, i.e. a monofunctional acrylate. The product was an ink having a viscosity of 5.4 mPas at 25° C. The ink was printed onto cardboard and exposed by passing at 30 m/min under light from an iron-doped ultraviolet lamp of power 120 W/cm. As in Example 1 the ink gave a print with good cure, adhesion and chemical resistance.

Example 3

| Sartomer 285 (UV diluent from Cray Valley) | 69.4 parts |
|---|---|
| Solsperse 32000 (dispersant from Avecia) | 0.40 parts |
| Irgalite Blue (pigment from Ciba) | 3.60 parts |
| Genorad 16 | 0.05 parts |
| Rapi-cure DVE-3 (difunctional vinyl ether from ISP Europe) | 10.0 parts |
| Lucirin TPO (photoinitiator from BASF) | 8.5 parts |
| Benzophenone (photoinitiator) | 4.0 parts |
| Irgacure 184 (photoinitiator from Ciba) | 4.0 parts |
| Byk 307 (defoamer from BYK Chemie) | 0.05 parts |

Sartomer 285 is tetrahydrofuryl acrylate, i.e. a monofunctional acrylate. The product was an ink having a viscosity of 5.8 mPas at 25° C. The ink was printed on to cardboard and exposed by passing at 30 m/min under light from an iron-doped ultraviolet lamp of power 120 W/cm. As in Example 1 the ink gave a print with good cure, adhesion and chemical resistance.

The invention claimed is:

1. An ink-jet ink which is substantially free of water, volatile organic solvents and multifunctional (meth)acrylates, comprising at least one monofunctional (meth)acrylate monomer, at least one α,β-unsaturated ether monomer, at least one radical photoinitiator and at least one colouring agent, the ink having a viscosity of less than 50 mPas at 25° C.

2. An ink-jet as claimed in claim 1 which is suitable for printing onto porous substrates.

3. An ink-jet ink as claimed in claim 1 or 2, wherein the ink includes, by weight, from 2 to 15 parts of monofunctional (meth)acrylate monomer to 1 part of α,β-unsaturated ether monomer.

4. An ink-jet ink as claimed in any preceding claim, wherein the monofunctional (meth)acrylate monomer is selected from the esters of acrylic acid, for example octyl acrylate, decyl acrylate, isobornyl acrylate, phenoxyethyl acrylate, tetrahydrofuryl acrylate, 2-(2-ethoxyethoxy) ethylacrylate, and mixtures thereof.

5. An ink-jet ink as claimed in any preceding claim, wherein the monofunctional (meth)acrylate monomer is present in an amount from 50 to 95% by weight, preferably from 60 to 80% by weight.

6. An ink-jet ink as claimed in any preceding claim, wherein the α,β-unsaturated ether monomer is present from 1 to 30% by weight, preferably from 7 to 15%, provided that the ratio of (meth)acrylate monomer to α,β-unsaturated ether monomer is between 2:1 and 15:1.

7. An ink-jet ink as claimed in any one of the preceding claims, wherein the α,β-unsaturated ether monomer is a vinyl ether monomer.

8. An ink-jet ink as claimed in claim 7, wherein the vinyl ether is selected from triethylene glycol divinyl ether, diethylene glycol divinyl ether, 1,4-cyclohexanedimethanol divinyl ether, ethylene glycol monovinyl ether and mixtures thereof.

9. An ink-jet ink as claimed in any preceding claim, wherein the photoinitiator is a free radical photoinitiator, preferably selected from benzophenone, 1-hydroxycyclohexyl phenyl ketone, 2-benzyl-2-dimethylamino-(4-morpholinophenyl)butan-1-one, benzil dimethylketal, bis(2,6-dimethylbenzoyl)-2,4,4-trimethylpentylphosphine oxide or mixtures thereof.

10. An ink-jet ink as claimed in any preceding claim, wherein the photoinitiator is present from 1 to 20% by weight, preferably from 4 to 10% by weight, of the ink.

11. An ink-jet ink as claimed in any preceding claim, wherein the ink includes a dispersible pigment as a colouring agent.

12. An ink-jet ink as claimed in claim 11, wherein the dispersible pigment is present from 0.5 to 15% by weight, more preferably from 1 to 5% by weight, of the ink.

13. A method of ink-jet printing, wherein the method uses the ink-jet ink as claimed in any preceding claim.

14. A method as claimed in claim 13, wherein printing is carried out onto porous substrates.

* * * * *